United States Patent [19]

Masunaga et al.

[11] Patent Number: 4,679,066
[45] Date of Patent: Jul. 7, 1987

[54] COLOR IMAGE PICKUP DEVICE

[75] Inventors: Makoto Masunaga; Tomotaka Muramoto, both of Tokyo; Kenichi Nagasawa, Kanagawa, all of Japan

[73] Assignee: Canon Kabushiki Kaisha, Tokyo, Japan

[21] Appl. No.: 926,807

[22] Filed: Oct. 30, 1986

Related U.S. Application Data

[63] Continuation of Ser. No. 501,985, Jun. 7, 1983, abandoned.

[30] Foreign Application Priority Data

| Jun. 9, 1982 | [JP] | Japan | 57-99851 |
| Jun. 9, 1982 | [JP] | Japan | 57-99852 |
| Jun. 9, 1982 | [JP] | Japan | 57-99860 |
| Mar. 29, 1983 | [JP] | Japan | 58-53009 |
| Mar. 29, 1983 | [JP] | Japan | 58-53010 |

[51] Int. Cl.$^4$ .............................................. H04N 9/73
[52] U.S. Cl. ......................................... 358/29; 358/28
[58] Field of Search .................... 358/29, 906, 28, 190

[56] References Cited

U.S. PATENT DOCUMENTS

| 4,274,107 | 6/1981 | Tamura et al. | 358/29 |
| 4,335,397 | 6/1982 | Tamura | 358/29 |
| 4,340,903 | 7/1982 | Tamura | 358/29 X |
| 4,454,532 | 6/1984 | Hani et al. | 358/29 |
| 4,457,021 | 6/1984 | Belisomi | 358/190 X |

FOREIGN PATENT DOCUMENTS

0090688 7/1981 Japan .................................... 358/29

Primary Examiner—Michael A. Masinick
Attorney, Agent, or Firm—Toren, McGeady & Associates

[57] ABSTRACT

A color image pickup system includes image pickup apparatus for obtaining a color video signal from an optical image; adjusting apparatus for adjusting the hue of the color video signal produced from the image pickup apparatus; memory apparatus which determines the state of the adjusting apparatus depending on data stored therein; control apparatus which alters the data stored in the memory apparatus by using the output of the image pickup apparatus; and apparatus for supplying initial data to the memory apparatus.

27 Claims, 10 Drawing Figures

COLOR IMAGE PICKUP DEVICE

This is a continuation of application Ser. No. 501,985, filed June 7, 1983 now abandoned.

BACKGROUND OF THE INVENTION

1. Field of the Invention

This invention relates to a color image pickup system and, more particularly, to a system which utilizes at least a part of the image pickup apparatus for automatic adjustment of white balance.

2. Description of the Prior Art

Figure 1:
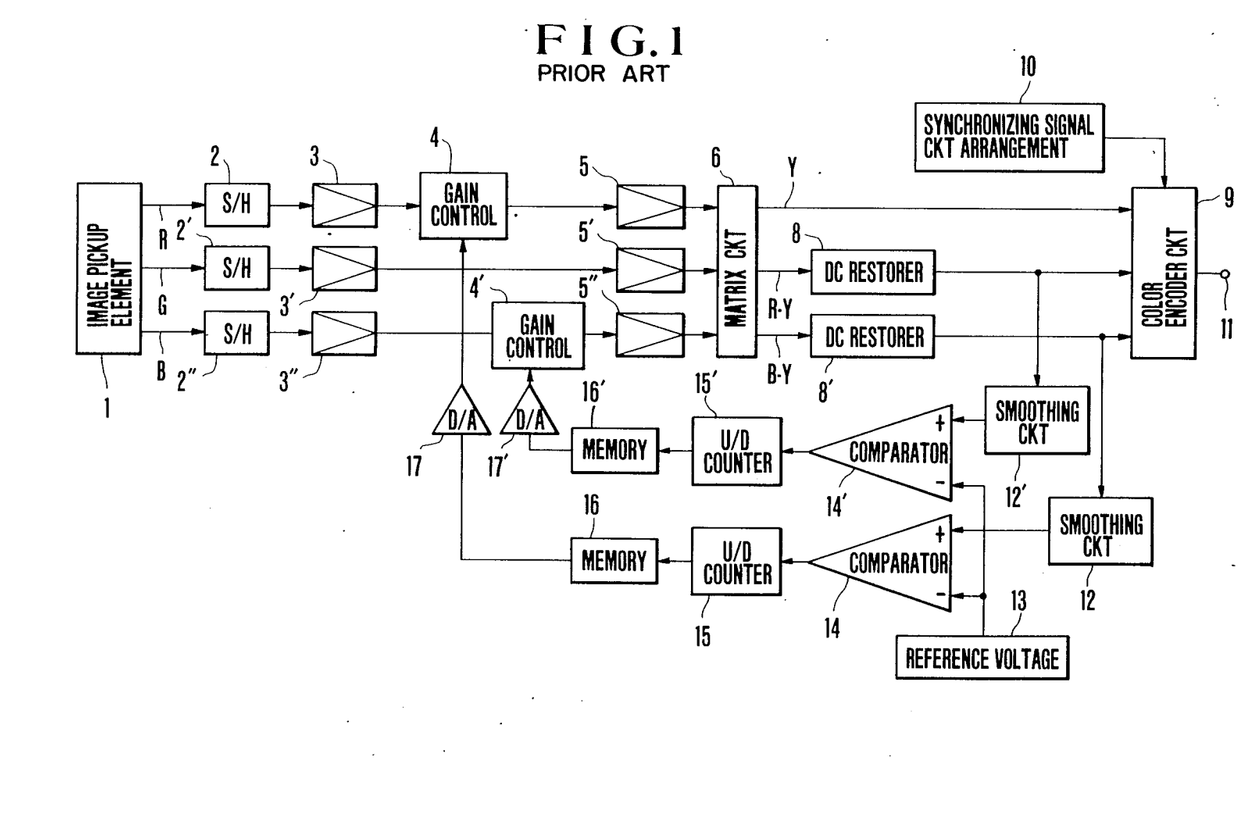
FIG. 1 is a circuit diagram showing an example of the conventional color image pickup system.

Heretofore there have been proposed various color image pickup systems of the type having an automatic white balance adjusting function. FIG. 1 of the accompanying drawings shows an example of the conventional color image pickup system having the automatic white balance adjusting function. In this example, primary color signals for red, green and blue (hereinafter called signals R, G and B respectively) are obtained from an image pickup element. Referring to FIG. 1, the signals R, G and B, which are image pickup outputs of the image pickup outputs of the image pickup element 1, are supplied to processing amplifiers 5, 5' and 5" respectively through sampling hold circuits 2, 2' and 2" (hereinafter called S/H circuits) and pre-amplifiers 3, 3' and 3". The outputs of the processing amplifiers 5, 5' and 5" are supplied to a matrix circuit 6. The matrix circuit 6 forms a brightness signal (hereinafter called the signal Y) and color difference signals R-Y and B-Y respectively from the primary color signals. The color difference signals R-Y and B-Y are supplied to DC restorers 8 and 8' which respectively include low-pass filters and clamping circuits. The outputs of the DC restorers 8 and 8' are supplied to a color encoder circuit 9 together with the above-stated signal Y.

At the color encoder circuit, the signal Y has a synchronizing signal added thereto and is clipped. Meanwhile, the color difference signals are subjected to a modulation process, etc. Then, the signal Y and the color difference signals are mixed into a color television signal, which is produced from the terminal 11 of the encoder circuit 9. A synchronizing signal circuit arrangement 10 produces a blanking signal, a chrominance subcarrier, etc. as well as the synchronizing signal.

There are provided gain control circuits 4 and 4' which are disposed on the transmission routes for the signals R and B and which adjust white balance by controlling the levels of the signals R and B with the signal G used as a reference. The outputs of the DC restorers 8 and 8' are supplied to comparators 14 and 14' through smoothing circuits 12 and 12'. The comparators 14 and 14' cause up-down counters 15 and 15' (hereinafter called U/D counters) to count upward when the levels of these signals are lower than the reference voltage level produced from a reference voltage generator 13 and to count down when their levels are higher than the reference voltage. The outputs of the U/D counters 15 and 15' are supplied to the gain control circuits 4 and 4' through memories 16 and 16' and digital-to-analog converters 17 and 17' (hereinafter called the D/A converters). This determines the gain of each of the circuits 4 and 4'.

When the operator of the system issues a control instruction for white balance by turning on a switch which is not shown, the image pickup element 1 produces a signal corresponding to a white or gray color. If the operator then directs the image pickup element 1 toward a white object or places a white transmitting diffusion plate or the like in a picture-taking light flux, the gain control circuits 4 and 4' control and adjust the color difference signals R-Y and B-Y to a zero level through the processes described above. In other words, the white balance is adjusted with the output signals of the U/D counters 15 and 15' used as control signals. After that, with the control signals supplied to the memories 16 and 16', the gains of the gain control circuits 4 and 4' are determined by white balance control signals stored in the memories 16 and 16' during an image pickup operation.

The color image pickup system described above has been used as a camera for a video tape recorder (hereinafter called VTR). In the meantime, there has recently been proposed a system (hereinafter called the SV system) which gives color still pictures by discretely extracting one-field portions of a color picture signal and by recording them in circular tracks on a magnetic recording sheet, so that color still pictures can be obtained by continuously reproducing these circular tracks.

Generally, the SV system is not operated continuously over a relatively long period of time but is operated over a relatively short period of time. For example, the SV system is operated to obtain several pictures at a time in the same manner as in ordinary photographic cameras using silver salt films.

If the conventional arrangement is adopted for the SV system, various problems with regard to white balance adjustment arise as described below.

In order to satisfactorily accomplish white balance adjustment in the SV system, the white balance must be adjusted immediately before every image pickup operation. However, since the SV system is intended to be used in the same manner as in conventional photographic cameras, such white balance adjustment that is to be carried out immediately before every image pickup operation tends to result in a failure to seize opportunities for picture coloring. A conceivable solution to the problem is to have power constantly supplied and to carry out an image pickup operation by using control data stored in memory. Such an arrangement, however, not only results in increased power consumption but also tends to carry out an image pickup operation on the basis of control data which has already become invalid and inadequate. Besides, in such a situation, an important scene might inevitably be recorded with a faulty signal while the operator is not aware of inadequate control data.

An object of the present invention is to provide a color image pickup system having a white balance adjusting function which is highly suited for the above SV system.

Another object of the invention is to provide a color image pickup system which is capable of giving a picture signal of acceptable white balance even in situations where an image pickup operation is carried out for the first time or after the lapse of a very long period during which the system has remained unused. The system uses, in such a case, prescribed initial data as control data for controlling white balance adjustment.

A further object of the invention is to provide a color image pickup system which does not cause missed photography opportunities and never causes any faulty signal to be recorded in a system capable of effectively using control data stored in a memory arrangement.

Still another object of the invention is to provide a color image pickup system wherein the validity of control data stored in a memory arrangement is judged and determined to minimize the necessity of troublesome white balance adjustment.

It is another object of the invention to provide a color image pickup system which makes a display according to control data stored in a memory arrangement to inform the operator of the degree of existing white balance prior to an image pickup operation.

An additional object of the invention is to provide a color image pickup system which minimizes power consumption.

These and further objects and features of the invention will become apparent from the following detailed description of preferred embodiments thereof taken in conjunction with the accompanying drawings.

SUMMARY OF THE INVENTION:

The objects of the invention are obtained in a color image pickup system which includes image pickup means for obtaining a color video signal from an optical image together with hue adjusting means for adjusting the hue of the color video signal produced by the image pickup means and memory means for determining the state of the hue adjusting means according to the data stored therein. The apparatus also includes control means for varying the data stored in the memory means by utilizing the output of the image pickup means and initial data supply means for supplying initial data to the memory means.

DETAILED DESCRIPTION OF THE PREFERRED EMBODIMENTS

Figure 2:
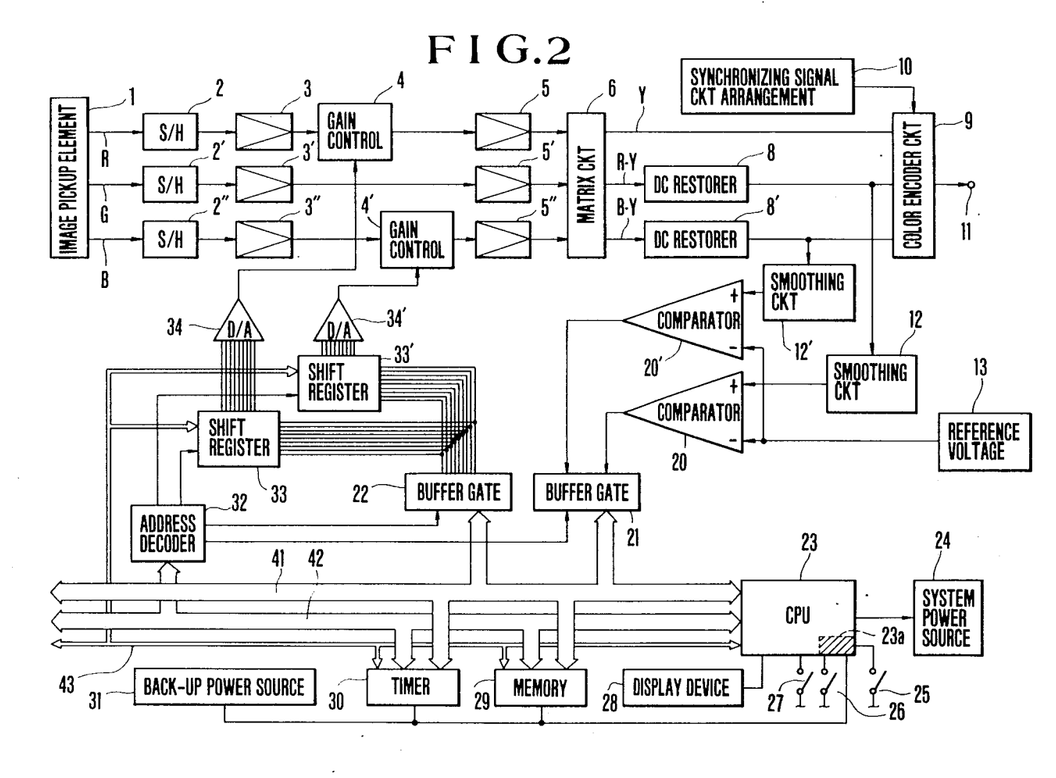
FIG. 2 is a circuit diagram showing a color image pickup system in an embodiment of the present invention.

Referring to FIG. 2, which shows the circuit arrangement of a color image pickup system in an embodiment of the present invention, the components of the embodiment which are similar to corresponding components of the conventional system shown in FIG. 1 are indicated by the same reference numerals as those used in FIG. 1. The embodiment includes comparators 20 and 20' which have their outputs placed on a data bus 41 through a buffer gate 21; a central processing unit 23 such as a microcomputer or the like (hereinafter called a CPU); a system power source 24 disposed within a portion of the image pickup system (not shown in FIG. 2); a power source switch 25; a white balance instruction switch 26; and an image pickup instruction switch 27. A part 23a of the CPU 23 constantly receives power supplied from a back-up power source 31 which ensures continuous power to the part 23a even when the power source switch 25 turns off, so that the part 23a remains operative. The embodiment also includes a display device 28 which indicates whether the white balance control data written in a memory 29 is valid in such a manner as described later herein; a timer 30; an address decoder 32; and shift registers 33 and 33' which control, through a buffer gate 22, the data stored by the CPU 23. These shift registers 33 and 33' are of a parallel-in, parallel-out 8 bit arrangement. The outputs of the shift registers 33 and 33' are white balance control data signals which are supplied to gain control circuits 4 and 4' to control their gains through D/A converters 34 and 34'.

Figure 3:
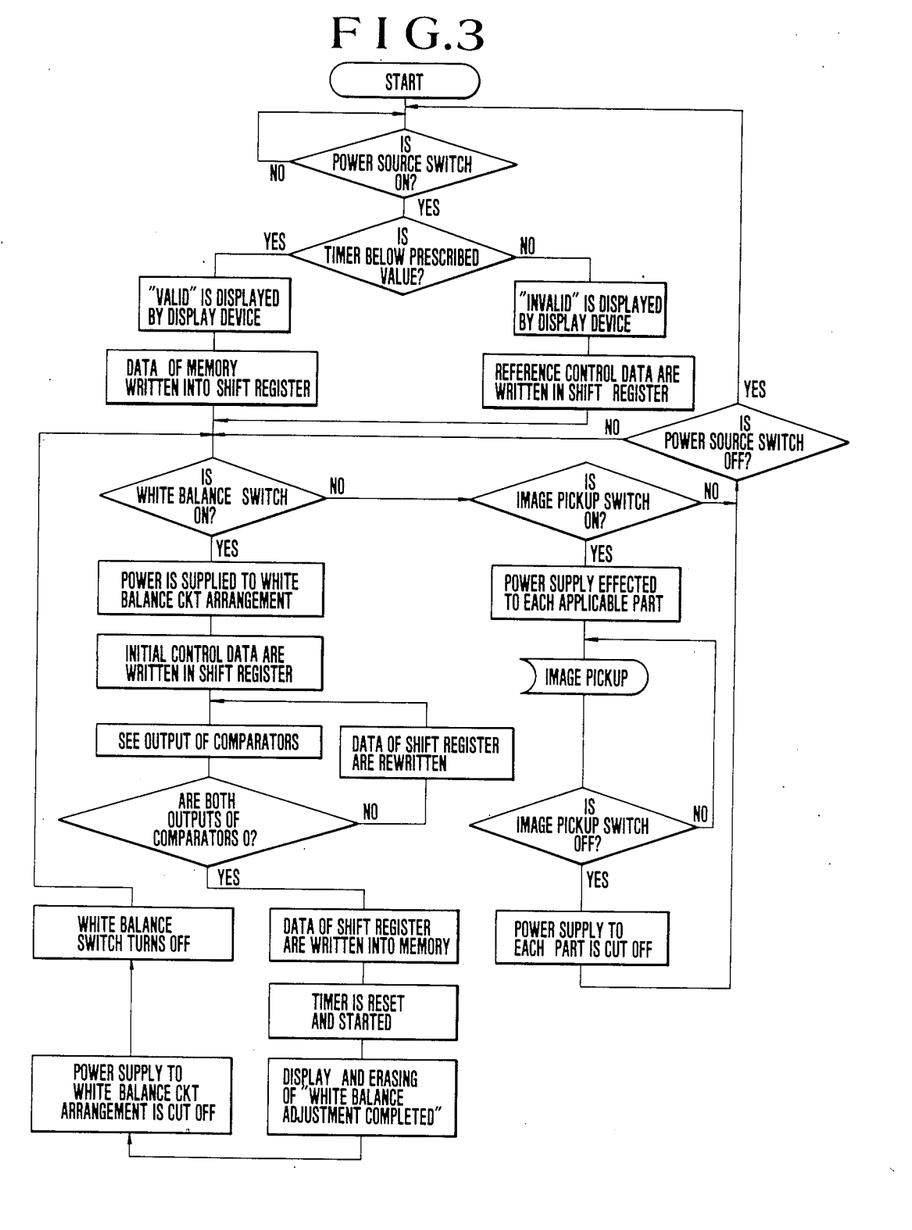
FIG. 3 is a flow chart showing the operation of the system shown in FIG. 2.

The operation of the system arranged above is shown in a flow chart in FIG. 3. Referring to FIG. 3, when the power source switch 25 is turned on, power is supplied to the CPU 23 and the shift registers 33 and 33'. This renders the CPU 23 operative. Then a stand-by condition of the system awaits a switching-on operation either on the white balance switch 26 or on the image pickup switch 27.

When the white balance switch 26 is switched on under this condition, power is supplied to the parts of the system required for white balance adjustment. Then, the operator operates the system obtaining a signal corresponding to a white or gray color from an image pickup element 1 in the same manner as described in the foregoing. The shift registers 33 and 33' then have reference or initial data for white balance control respectively written therein. The reference white balance control data has been stored at the part 23a of the CPU 23 which is followed by the back-up power source 31 and is supplied from the CPU 23 to the shift registers 33 and 33'. The shift registers 33 and 33' produce control data. The control data produced from the shift registers 33 and 33' is converted into analog control signals by the D/A converters 34 and 34' and is then supplied to the gain control circuits 4 and 4' to determine respectively the amplification gains of the signals R and B.

Then, if it is solely the picture signal Y that is produced from a terminal 11, white balance has been obtained and the output of both the comparators 20 and 20' becomes zero. If the output includes the color difference signal B-Y or R-Y, the white balance has not been obtained. In the latter case, either one or both of the comparators 20 and 20' produces an output other than zero. When there is an output other than zero from one or both of the comparators 20 and 20', the data stored at the shift registers 33 and 33' is rewritten. For example, if the output of the comparator 20 is positive, the datum of the shift register 33 is reduced and the degree of amplification of the signal R is lowered making the color difference signal R-Y zero. In FIG. 2, the shift register 33 has an 8 bit arrangement. If the reference control datum is 10000000 (2) and the output of the comparator 20 is positive, the datum of the shift register 33 is decreased by 1 and is thus reduced to 01111111 (2). After that, if the output of the comparator 20 still remains positive, the datum is further decreased by 1 and is thus reduced to 01111110 (2). The datum of the shift register 33 is thus reduced step by step until the output of the comparator 20 becomes zero. Meanwhile, the datum of the other shift register 33' changes at the same time depending on the output of the comparator 20'. When the outputs of both comparators 20 and 20' become zero, the white balance adjustment is completed. Then, the data in the shift registers 33 and 33' at that instant becomes new white balance control data. The control data is then supplied to and stored by the memory 29, which is being followed by the back-up power source 31. Concurrently, the timer 30 is reset and restarted. Furthermore, the display device 28 indicates, for a given length of time, that the white balance has been adjusted. Then, with the exception of the shift registers 33 and 33', power supplied to all other parts participating in white balance adjustment is cut off. The white balance switch 26 is turned off and the system returns to the stand-by condition.

When the image pickup tube switch 27 is turned on under the stand-by condition, power is supplied from the system power source 24 to each component required for an image pickup operation. In this instance, no power is supplied to the comparators 20 and 20', to smoothing circuits 12 and 12', etc. that are provided only for the purpose of performing white balance adjustment. An image pickup operation is carried out with the power thus supplied to each applicable part of the system. The operation of each component and that of the CPU 23 at the time of the image pickup operation of the system are not relative to the present invention. At the image pickup time, the amplification gains of the gain control circuits 4 and 4' are determined in accordance with the white balance control data stored in the shift registers 33 and 33' or according to the reference white balance control data to be described herein. Upon completion of the image pickup operation, the image pickup switch 27 is either automatically or manually turned off. In the flow chart of FIG. 3, the image pickup switch 27 is manually turned off by the operator. With the image pickup switch 27 turned off, the power supply to each applicable part is cut off and the system returns to the stand-by condition.

When the power source switch 25 is turned off in the stand-by condition, the power supply to the shift registers 33 and 33' and to the CPU 23 is also cut off. Then, the system again returns to a waiting condition, switching on the power source switch 25. The operation of the system when the power source switch 25 is turned on is as follows. With the switch 25 turned on, power is supplied to the CPU 23 and the shift registers 33 and 33' in the same manner as described previously. At that point in time, a time count datum obtained by the timer 30 determines whether the control data stored at the memory 29 is valid or invalid depending on the length of time which has elapsed after the last white balance adjustment. More specifically, if the time count datum obtained by the timer 30 does not exceed a prescribed value, it indicates that the control data stored in the memory 29 is still valid, since not much time has elapsed from the last white balance adjustment. Conversely, if the time count value by the timer 30 exceeds the prescribed value, the control data stored in the memory 29 is judged to be invalid. When the data is judged to be valid, the control data stored in the memory 29 is written into the shift registers 33 and 33' and the validity of the data is displayed by the display device 28. When the control data, on the other hand is invalid, the reference white balance control data mentioned in the foregoing is written into the shift registers 33 and 33' and the display device 28 displays the invalidity of the control data. This puts the system into the stand-by condition, in which the system waits to have either the white balance instruction switch 26 or the image pickup switch 27 turned on. When invalid, however, it is not preferable to use the reference control data. If the invalidity is displayed, the operator preferably turns on the white balance instruction switch 26, newly setting the white balance control data.

In the specific embodiment shown in FIG. 2, initial data is given to the shift registers 33 and 33' which determine the state of the gain control circuits 4 and 4' for adjustment of hue. The white balance is adjusted by varying the initial data. This arrangement clearly defines the period for the white balance adjustment. Therefore, it is possible to shut off the power supply to the parts which are not participating in the white balance adjustment such as an encoder circuit 9, a synchronizing signal circuit 10, a sound circuit, an automatic focusing mechanism, etc. during the white balance adjustment period. This is an advantage of the embodiment in terms of power consumption.

After white balance adjustment, control data to be used for determining the amplification gains of the gain control circuits 4 and 4' are stored in the memory 29 which is followed by the back-up power source 31. This arrangement simplifies the operation of the system because it deletes the necessity for readjustment of the white balance where the power source switch 25 is to be turned on again several minutes after it is turned off. With respect to power consumption, the back-up power source 31 ensures adequate supply of a very small amount of power required for holding the memory 29 storage to delete the necessity for constant use of a power source for that purpose as in the conventional system. This is another advantage of the embodiment.

The length of time after the white balance adjustment is measured by the timer 30 and the validity of the control data obtained through the adjustment is determined by the CPU 23. This arrangement completely precludes the possibility of using inadequate control data. Where the control data is determined and judged to be valid, the system eliminates wasteful readjustment of white balance.

The judgment result is displayed by the display device 28. This arrangement enables the operator to see whether or not the white balance should be readjusted. Image pickup operations can always be carried out with adequately adjusted white balance because the white balance is automatically adjusted.

While the shift registers 33, 33' of the 8 bit arrangement are used for gain control in the embodiment, the invention is not limited to such a use. The shift registers 33, 33' may be replaced with some other suitable element such as memory 29, etc. Furthermore, the 8 bit arrangement of the shift registers 33, 33' may be replaced with an arrangement of any number of bits.

Furthermore, in the specific embodiment described in the foregoing, the value of time count performed by the timer 30 is used for judging the setting value validity. In accordance with the invention, however, this judging method may be replaced with the following method: The data stored in the memory 29 is erased in response to arrival of the timer 30 at a prescribed value or a datum which represents invalidity is inserted and applied to a predetermined bit within the data in such a way as to change 0 to 1.

Figure 4:
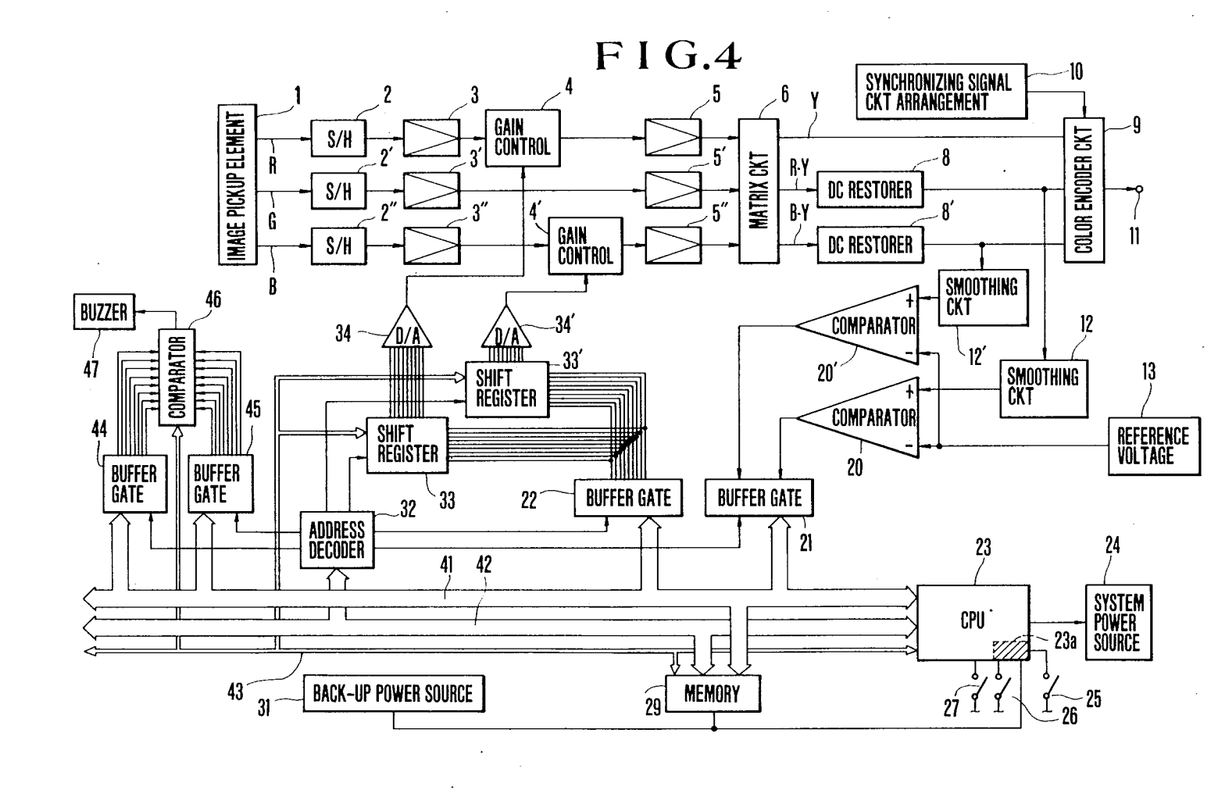
FIG. 4 is a circuit diagram showing a color image pickup system in another embodiment of the invention.

FIG. 4 shows a color image pickup system in another embodiment of the invention. In FIG. 4, the components of the system which are similar to corresponding components of other system components shown in FIGS. 1 and 2 are indicated by the same reference numerals and are omitted from the following description: This embodiment includes a comparator 46, which compares data obtained via a buffer gate 44 with data obtained via another buffer gate 45. The comparator 46 includes, for example, a subtracting circuit and produces a high level signal when the result of a subtracting operation on this data is greater than a prescribed absolute value. This signal is supplied to a buzzer 47, which produces a warning sound when the input signal level is high. The following description deals with the operation of this embodiment with reference to the flow chart of FIG. 5.

Some parts of the operation are similar to the operation shown in FIG. 3 and therefore may be omitted from the description here. When the power source switch 25 is turned on, power is supplied to the CPU 23 and to the shift registers 33 and 33'. The CPU 23 becomes operative. Data stored in the memory 29 is supplied to the shift registers 33 and 33'. Then, the above stand-by condition is obtained. When the image pickup switch 27 is turned on in the stand-by condition, the embodiment operates in the same manner as in the preceding embodiment except that the image pickup switch 27 is automatically turned off in the flow chart of FIG. 5.

Figure 5:
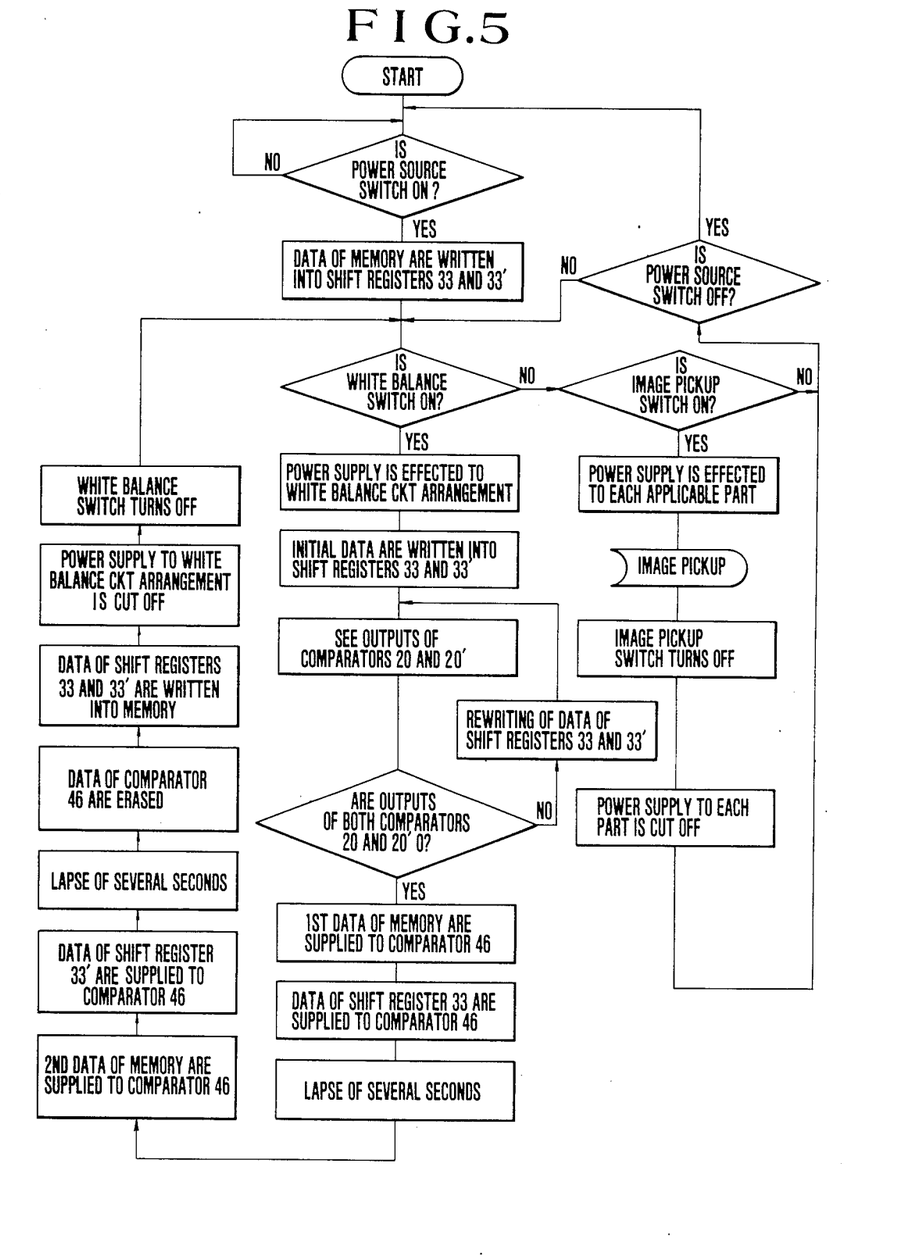
FIG. 5 is a flow chart showing the operation of the system of FIG. 4.

An image pickup operation can be carried out immediately after the power source switch 25 is turned on, as has been described above. In that situation, however, the white balance is adjusted by supplying the control data stored in the memory 29 directly to the shift registers 33 and 33'. With the system operated in this manner, however, it is possible that the white balance may have been lost.

To avoid such a possibility, the operator preferably turns on the white balance switch 26 during the stand-by condition after a preceding image pickup operation. With the white balance switch 26 thus turned on, power is supplied from the power source 24 to each of the applicable parts necessary for the adjustment of white balance. Then, in the same manner as in the preceding embodiment shown in FIG. 2, the white balance adjustment is completed when the output levels of the comparators 20 and 20' become zero. Upon completion of the adjustment, the data that is in the shift registers 33 and 33' at that time becomes new white balance control data. In an actual operation of the embodiment, however, the output levels of the comparators 20 and 20' never absolutely become zero. Accordingly, the new white balance control data remains below a prescribed absolute value.

Furthermore, in this instance, the memory 29 contains the old white balance control data which has been used for the last image pickup operation. Hereinafter, the control datum which is included in the control data stored in the memory 29 and which is to be supplied to the shift register 33 for controlling the gain control circuit 4 will be called the first datum and the datum which is to be supplied to the shift register 33' the second datum.

When the white balance control data newly enters the shift registers 33 and 33', this data is compared with the above first and second data. First, the first datum which is stored in the memory 29 is supplied to the comparator 46 through the buffer gate 44, while the datum of the shift register 33 is supplied to the comparator 46 through the buffer gate 45. However, at that time, the datum of the shift register 33 also remains as it is within the shift register 33. The comparator 46 compares these two data. If the absolute value of the difference between this data is larger than a prescribed value, the comparator 46 produces a high level signal producing a warning sound from the buzzer 47. In that situation, the buzzer 47 continues to produce the warning sound for several seconds.

After the lapse of several seconds, the second datum stored in the memory 29 is then supplied to the comparator 46 through the buffer gate 44, while the datum of the shift register 33' is also supplied to the comparator 46 through the buffer gate 45. In this instance, the datum of the shift register 33' also remains within the shift register 33' as it is. The two data are compared at the comparator 46. The buzzer 47 is likewise controlled until several seconds elapses.

When the several second elapsing routine again comes to an end, the data supplied to the comparator 46 is erased. With the data thus erased, the warning sound which has been produced from the buzzer 47 stops when the buzzer 47 produces the sound. The data of the shift registers 33 and 33' are, at this time, written into the memory 29 as first and second data respectively. After being written into the memory 29, power supplied to all parts that participate in white balance adjustment is cut off with the exception of the shift registers 33 and 33'. This turns off the white balance switch 26 bringing the system back to stand-by.

In this instance, the warning sound notifies the operator that the white balance has been lost during the image pickup operation that has just been completed. If no warning sound is produced from the buzzer 47, this notifies the operator that the white balance has been adequate. Therefore, when the warning sound is produced, the operator of the system can take any necessary action, such as carrying out the same image pickup operation over again.

While, in the particular instance described above, the adjustment of the white balance is carried out immediately after an image pickup operation, it will be apparent from the flow chart of FIG. 5 that the white balance can be adjusted any time as long as the system is in stand-by. For example, white balance adjustment is preferably carried out immediately before an image pickup operation if there is no fear of missing a shutter chance.

With the system as described in the foregoing, the system can be operated as desired at any time without missing valuable shutter chances. It also enables the operator to know immediately whether the white balance has been adequate or inadequate, preventing him or her from failing to notice that an image pickup operation has been carried out with inadequate white balance.

Figure 6:
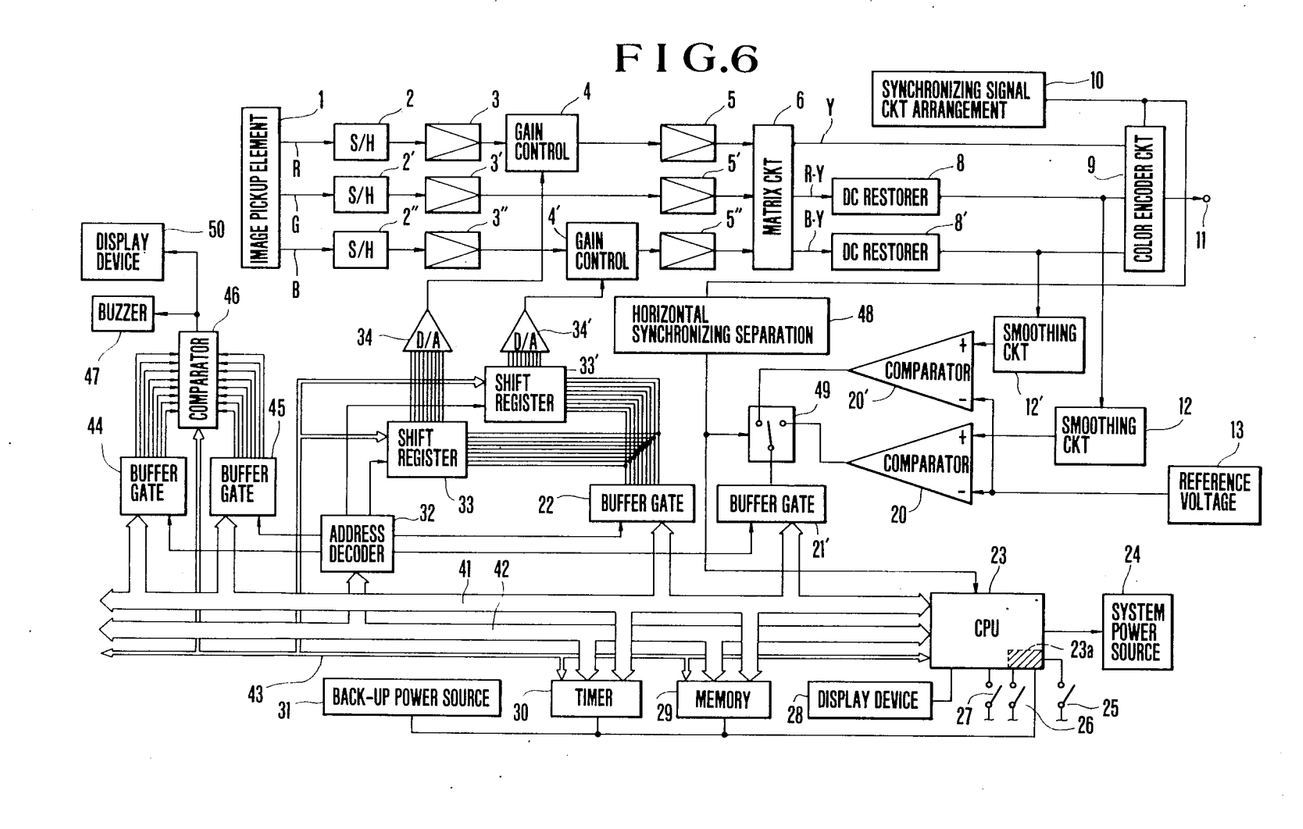
FIG. 6 is a circuit diagram showing a color image pickup system in a further embodiment of the invention.

A further embodiment of the present invention is shown in FIG. 6. The components of the system which are similar to those components of the systems shown in FIGS. 1 and 2 are indicated by the same reference numerals in FIG. 6 and are omitted from the following description.

Referring to FIG. 6, the outputs of the comparators 20 and 20' are supplied to an analog switch 49. The analog switch 49 is under the control of a horizontal synchronizing signal separated by a horizontal synchronizing signal separating circuit 48 from a synchronizing signal which is obtained from a synchronizing signal adding circuit arrangement 10. The analog switch 49 thus has the output signals of the comparators 20 and 20' arranged in a line sequential manner. As a result of this arrangement, the buffer gate 21' has a number of bits which is one half of the number of bits of the buffer gate 21 shown in FIG. 2. This arrangement thus permits a data transmission route capacity which is only one half of the capacity which would be required otherwise. A display element 50 indicates the inadequacy of white balance when the comparator 46 produces a high level signal.

Figure 7:
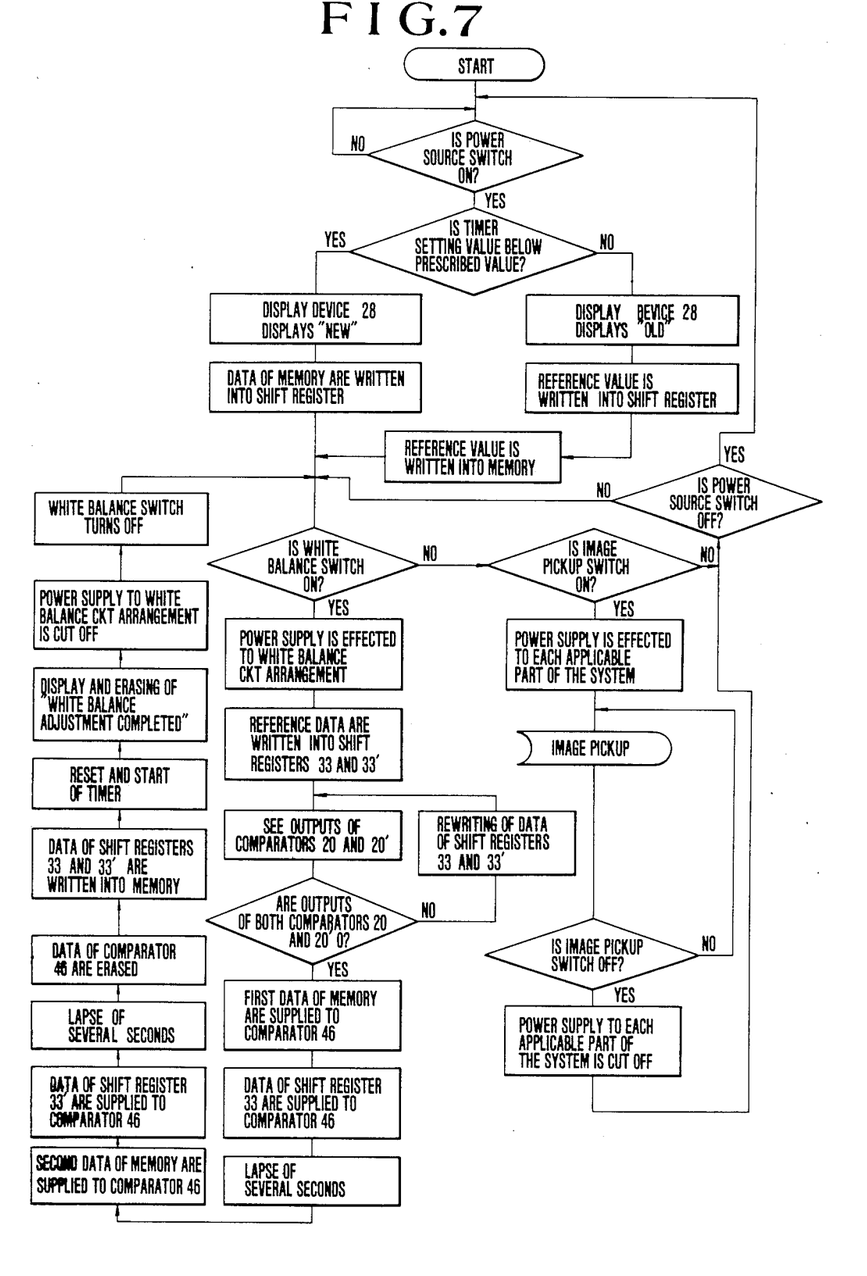
FIG. 7 is a flow chart showing the operation of the system of FIG. 6.

FIG. 7 shows in a flow chart, by way of example, the operation of the system described above and that shown in FIG. 6. The parts of the flow chart which correspond to those of the system shown in FIGS. 2 or 4 may be omitted from the following description. After the power source switch 25 is turned on, the display device 28 indicates the length of time which has elapsed since the last white balance adjustment in the same manner as in the embodiment shown in FIG. 2. Furthermore, a stand-by condition is attained when either reference control data or control data stored in the memory 29 is written into the shift registers 33 and 33'.

The operation which is performed with the image pickup switch 27 turned on in the stand-by condition is similar to that of the system of FIG. 2. However, when the white balance switch 26 is turned on in the stand-by condition initiating an image pickup operation, the embodiment rewrites the data of the shift registers 33 and 33' in the same manner as the system of FIG. 4. If there is a great difference between the white balance control data which has been used for image pickup and is stored in the memory 29 and new white balance control data, the buzzer 47 produces a warning sound for several seconds. Concurrently, an inadequate white balance is indicated by the display device 50.

The control data within the shift registers 33 and 33' is then stored in the memory 29 by virtue of the backup power source 31 which follows the memory 29. At the same time, the timer 30 is reset and restarted. Furthermore, the display device 28 operates for a predetermined period indicating that the white balance has been adjusted. Then, power supplied to all parts that participate in white balance adjustment, with the exception of the shift registers 33 and 33', is cut off. The white balance switch 26 is turned off and the system returns to stand-by.

Such being the arrangement of the system, when the power source switch 31 is turned on, the display device 28 enables the operator to see whether the control data stored in the memory 29 is old or new. If the control data is new, it is not absolutely necessary to readjust the white balance and to operate the comparator 46 to determine the validity or invalidity of the control data. When the control data is old, on the other hand, it is highly necessary to readjust the white balance and to determine or judge the validity of the control data stored in the memory 29.

In accordance with the arrangement of this embodiment, therefore, the operability of the system can be further improved over the embodiment shown in FIG. 2 because the embodiment enables the operator to see whether or not it is necessary to confirm the deviation or non-deviation of the white balance. The embodiment is advantageous especially in cases where still pictures are to be continuously taken. The possibility of taking many pictures with inadequate white balance can be precluded by knowing beforehand to a certain degree the validity of the white balance control data.

Figure 8:
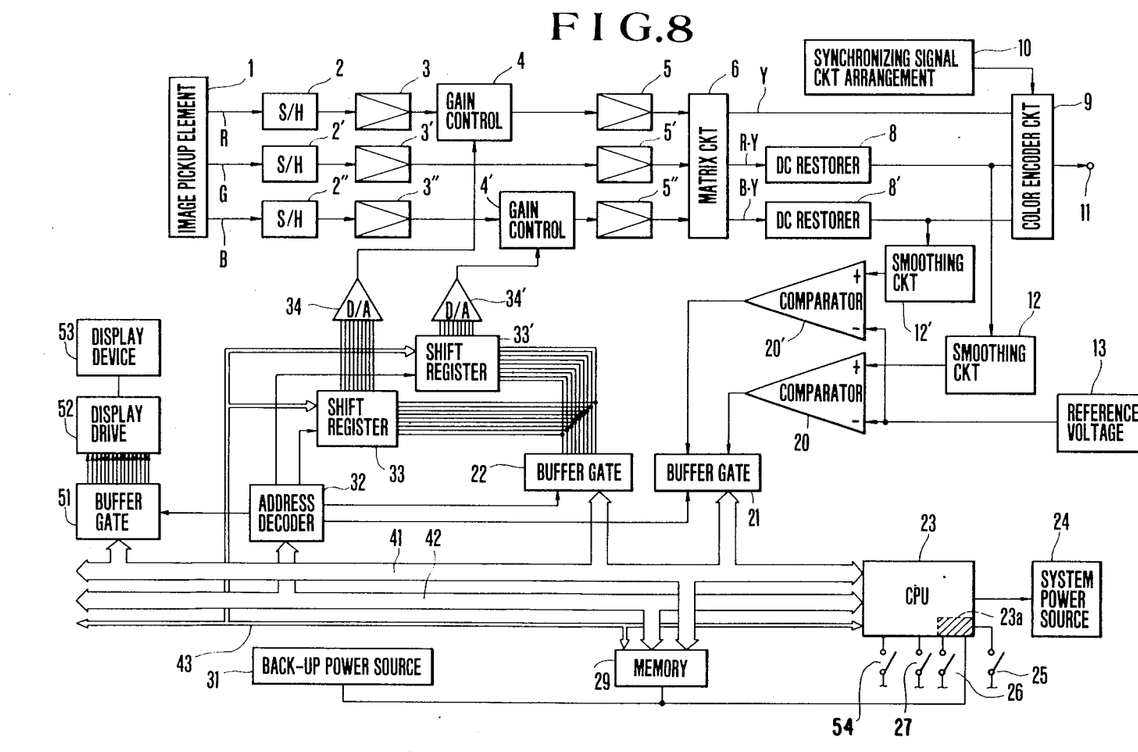
FIG. 8 is a circuit diagram showing a color image pickup system in still another embodiment of the invention.

FIG. 8 shows a color image pickup system in a further embodiment of the present invention. The components of the embodiment which are similar to those in the system shown in FIG. 2 are indicated by the same reference numerals in FIG. 8. The embodiment includes a display device 53 which has a display corresponding to the data stored in the memory 29. When the data is supplied to a display drive circuit 52 via a buffer gate 51, the display device 53 displays the data.

Figure 9:
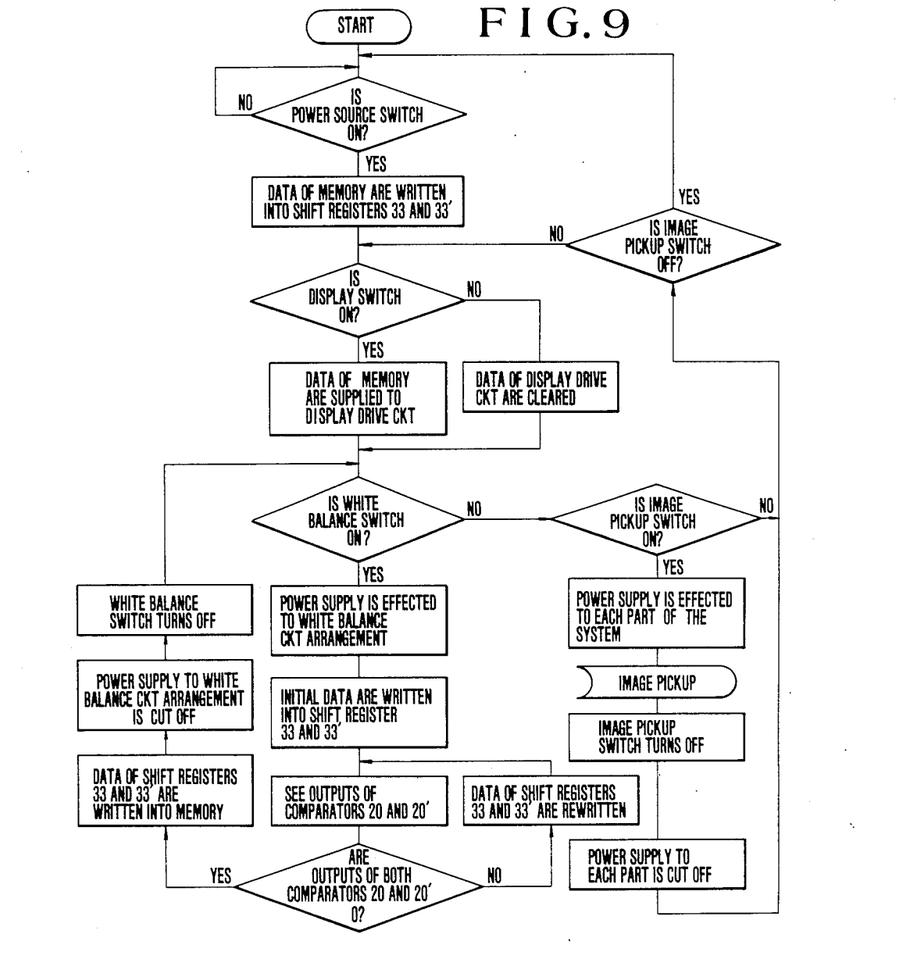
FIG. 9 is a flow chart showing the operation of the system of FIG. 8.
Figure 10:
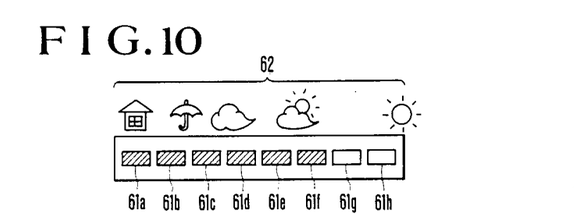
FIG. 10 is an illustration of a display device used in the system of FIG. 8.

The operation of this embodiment is illustrated in a flow chart in FIG. 9. Referring to FIG. 9, the system of FIG. 8 operates as follows. The operation of the system until it reaches the stand-by condition, after the power source switch 25 is turned on, is identical with the system of FIG. 4. The operation which takes place when the image pickup switch 27 is turned on in the stand-by condition is the same as the system of FIG. 4. When the white balance switch 26 is turned on in the stand-by condition, the control data is determined by the shift registers 33 and 33' and the new control data is stored in the memory 29 in the same amount as in the system of FIG. 2. An image pickup operation can thus be immediately carried out with the power source switch 25 turned on. In that instance, however, the white balance is adjusted by bringing the control data which is stored in the memory 29 into the shift registers 33 and 33'. In that instance, therefore, the white balance might be inadequate, as mentioned in the foregoing. The operator, therefore, looks at the indicator 53 to see under what weather conditions the control data has been obtained. The arrangement of the display device 46 of the embodiment is based on the assumption that the weather condition under which the control data has been obtained is generally inferred by examining the control data in relation to color temperature. An example of the display device 53 is shown in FIG. 10. In FIG. 10, the control data of 16 bits which is stored in the memory 29 is processed into data of 3 bits by the display drive circuit 52. The data thus processed then corresponds to display arrangement 62 representing indoor, rain, cloudy, fine weather conditions, etc. by means of eight liquid crystal display plates 61a-61h. For example, when using control data which is obtained when the weather is fine, all the display plates 61a-61h are in their display states. The number of the display plates 61a-61h that are displaying varies with the ambient brightness.

Therefore, with the display switch 54 turned on after an image pickup operation, the operator can find out the weather conditions under which the control data was used for white balance adjustment at the time of the image pickup operation. If the operator thinks that the weather under which the control data has been obtained is about the same as the present weather, he or she will be able to carry out an image pickup operation with adequate white balance. If the weather does not coincide with the present weather or, for example, if the display by the display device 53 represents fine weather, after completion of an image pickup operation which has been carried out indoors, the white balance must be readjusted and the image pickup operation must be carried out once more, if so desired.

After the power source switch 25 is turned on, if there is a sufficient length of time before the image pickup switch 27 must be turned on, the display by the display device 54 can be examined by turning the display switch 54 on. Then, if the present weather is about the same as the weather displayed by the display device 53, the white balance does not have to be readjusted. If the weather displayed is different from the present weather, the white balance must be readjusted.

The above-described arrangement of the embodiment enables the operator to immediately take a picture without missing a shutter chance. The arrangement of this embodiment enables the operator to immediately confirm whether or not the white balance has been adequate. Such confirmation precludes the possibility of taking pictures without knowing the inadequacy of white balance.

Furthermore, the arrangement enabling the operator to immediately know whether the white balance should be readjusted before picture taking enhances the ease of operation as the frequency of the white balance adjusting operation can be minimized. This advantage is great particularly where the picture color reproduction is not seriously required.

As apparent from the foregoing, the color image pickup system according to the present invention provides a white balance adjusting function which is highly suited for the SV system.

What we claim:

1. A color image pickup system comprising:
   image pickup means for obtaining a color video signal from an optical image;
   hue adjusting means for adjusting the hue of the color video signal produced by said image pickup means;
   first memory means for determining the state of said hue adjusting means according to data stored therein;
   control means for varying the data stored in said first memory means by utilizing the output of said image pickup means;
   second memory means for storing the data of said first memory means; and
   further including judging means for judging the validity of data stored in said second memory means.

2. A system according to claim 1, further including means for effecting power supply constantly to said second memory means.

3. A system according to claim 1, wherein said judging means includes a timer which is arranged to count the length of time elapsed after the data is stored in said second memory means, said judging means being arranged to make judgement according to the length of time counted by said timer.

4. A system according to claim 1, wherein said judging means includes a comparator which is arranged to compare the data stored in said second memory means with data stored in said first memory means, said judging means being arranged to make judgement according to the output of said comparator.

5. A system according to claim 1, further including display means which is arranged to make a display according to data stored in said second memory means.

6. A system according to claim 1, further including power supply inhibiting means for inhibiting power supply to all parts except said image pickup means, said hue adjusting means, said first memory means and said control means when said control means is in operation.

7. A color image pickup system comprising:
   image pickup means for obtaining a color picture signal from an optical image;
   hue adjusting means for adjusting the hue of the color picture signal obtained by said image pickup means;
   control signal producing means for producing a control signal for controlling said hue adjusting means by utilizing at least a part of said image pickup means;
   memory means for storing said control signal; and
   judging means for judging the validity of said control signal stored in said memory means.

8. A system according to claim 7, wherein said judging means includes a timer which is arranged to count the length of time elapsed after said control signal is produced from said control signal producing means, said judging means being arranged to make judgement according to the length of time counted by said timer.

9. A system according to claim 8, further including display means which is arranged to make a display according to the length of time counted by said timer.

10. A system according to claim 7, wherein said judging means includes a comparator which is arranged to compare the control signal stored in said memory means with a control signal newly produced from said control signal producing means, said judging means being arranged to make judgement according to the output of said comparator.

11. A system according to claim 10, further including display means for making a display according to the outut of said comparator.

12. A system according to claim 10, further including sound producing means for producing a sound according to the output of said comparator.

13. A system according to claim 7, further including signal producing means for producing a prescribed signal to be used as said control signal when said judging means makes judgement of invalidity.

14. A color image pickup system comprising:
   image pickup means for obtaining a color picture signal from an optical image;
   hue adjusting means for adjusting the hue of the color picture signal obtained by said image pickup means;
   control signal producing means for producing a control signal for controlling said hue adjusting means by utilizing at least a part of said image pickup means;
   memory means for storing said control signal; and
   display means for making plural kinds of displays about color temperature information.

15. A system according to claim 14, wherein said displaying means includes a plurality of display elements corresponding to plural kinds of color temperature.

16. A system according to claim 15, wherein said display means further includes drive means for driving said plurality of display elements according to the control signal stored in said memory means.

17. A system according to claim 16, wherein said drive means changes the number of said plurality of display elements which are driven in response to the control signal.

18. A color image pickup system comprising:
   image pickup means for obtaining a color video signal from an optical image;
   hue adjusting means for adjusting the hue of the color video signal produced by said image pickup means;
   first memory means for determining the state of said hue adjusting means according to data stored therein;

control means for varying the date stored in said first memory means by utilizing the output of said image pickup means;

second memory means for storing the data of said first memory means;

first manually operable means for starting the operation of said adjusting means; and initial data supply means for supplying initial data to said first memory means in response to an operation of said first manually operable means.

19. A system according to claim 18, further comprising second manually operable means for changing over the condition of power supply to said system.

20. A system according to claim 19, wherein said initial data supply means is arranged to be able to supply the initial data to said first memory means in response to an operation of said first manually operable means.

21. A system according to claim 20, further comprising judging means for judging the validity of data stored in said second memory means.

22. A system according to claim 21, further comprising change-over means for determining whether said initial data should be supplied to said first memory means in response to the operation of said first manually operable means.

23. A system according to claim 22, further comprising memorized data supply means for supplying data memorized in said second memory to said first memory means when said initial data supply means does not supply the initial data to said first memory means in response to the operation of said first manually operable means.

24. A system according to claim 23, wherein said judging means includes a timer which is arranged to count a length.

25. A color image pickup system comprising:

image pickup means for obtaining a color video signal from an optical image;

hue adjusting means for adjusting the hue of the color video signal produced by said image pickup means;

first memory means for determining the state of said hue adjusting means according to data stored therein;

control means for varying the data stored in said first memory means by utilizing the output of said image pickup means;

second memory means for storing the data of said first memory means;

judging means for judging the validity of data stored in said second memory means;

initial data supply means arranged to be able to supply initial data to said first memory means; and control means for controlling said initial data supply means based on an output of said judging means.

26. A system according to claim 25, wherein said judging means includes a timer which is arranged to count a length of time.

27. A color image pickup system comprising:

image pickup means for obtaining a color video signal from an optical image;

hue adjusting means for adjusting the hue of the color video signal produced by said image pickup means;

first memory means for determining the state of said hue adjusting means according to data stored therein;

control means for varying the data stored in said first memory means by utilizing the output of said image pickup means;

second memory means for storing the data of said first memory means; and initial data supply means for supplying initial data to said first memory means without supplying the initial data to said second memory means.

* * * * *